(No Model.)

R. T. SCHALL.
CART.

No. 346,619. Patented Aug. 3, 1886.

WITNESSES:
John A. Ellis
C. Sedgwick

INVENTOR:
R. T. Schall
BY Munn & Co.
ATTORNEYS.

UNITED STATES PATENT OFFICE.

REUBEN T. SCHALL, OF NORRISTOWN, PENNSYLVANIA.

CART.

SPECIFICATION forming part of Letters Patent No. 346,619, dated August 3, 1886.

Application filed May 18, 1886. Serial No. 202,537. (No model.)

*To all whom it may concern:*

Be it known that I, REUBEN T. SCHALL, of Norristown, in the county of Montgomery and State of Pennsylvania, have invented a new and Improved Cart, of which the following is a full, clear, and exact description.

My invention relates to the construction of a peculiar and novel form of dumping-cart, as will be hereinafter described, and specifically pointed out in the claims.

Reference is to be had to the accompanying drawings, forming a part of this specification, in which similar figures of reference indicate corresponding parts in both the figures.

Figure 1:
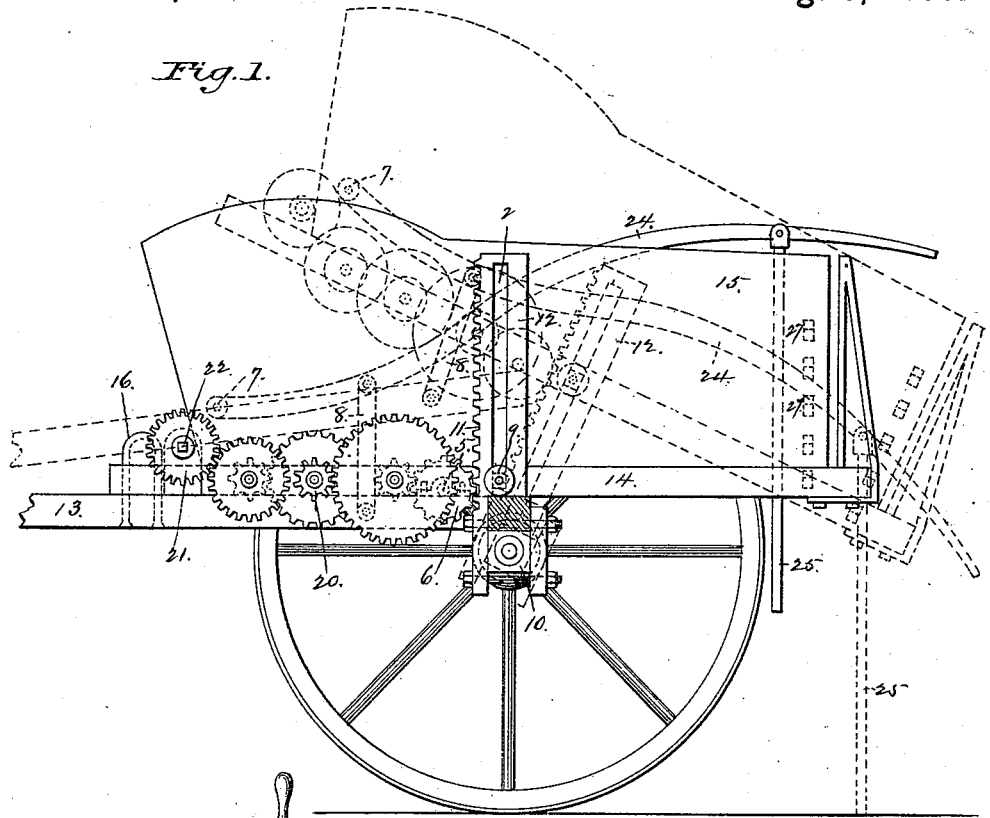
Figure 2:
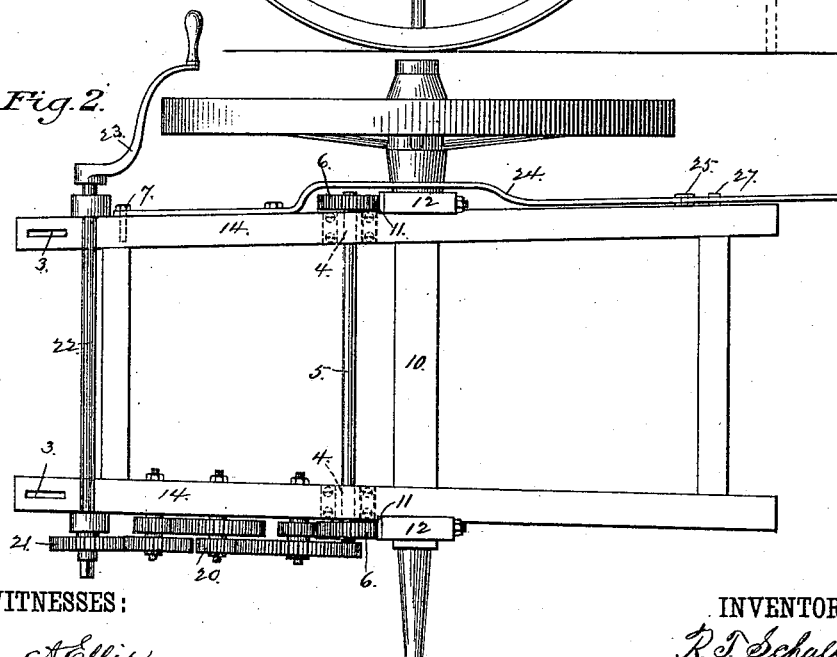

Figure 1 is a side view of my improved form of cart, one of the wheels being removed and the axle shown in section, in order to better disclose the dumping mechanism arranged in connection with the cart, the cart being shown in full lines in its normal position and in dotted lines in the position to which it is moved on being dumped; and Fig. 2 is a plan view of the running-gear, the body proper and the shafts being removed.

In the drawings, 10 is the axle, which is provided with two vertical racks, 11, which said racks are formed upon the forward faces of vertical standards 12, that are rigidly secured to the axle 10, and formed with longitudinal slots 2. The rear ends of the shafts 13 are pivotally connected to the bed-frame 14 of the wagon-body 15, the forward face of the side timbers of the said bed-frame 14 being slotted, as shown at 3, in order to permit of the passage of the staples 16, that are carried by the shafts 13, a bar being inserted between the upper looped ends of the staples and the side timbers of the bed-frame, in order to keep the cart from dumping, as will be readily understood.

The frame 14 is provided with bearings 4, in which there is mounted a transverse shaft, 5, carrying pinions or small gear-wheels 6, that engage with the racks 11, as clearly shown. Upon one side of the frame 14 there is mounted a train of power-transmitting gearing, 20, which train is set in motion through the medium of a gear-wheel, 21, that is carried by a shaft, 22, each end of said shaft being properly formed to fit within the socket of a crank-handle, 23. Upon the opposite side of the cart there is arranged a dumping-lever, 24, the forward end of which is pivoted to the wagon-body through the medium of a stud or bolt, 7, the lever being connected with the shafts 13 through the medium of a link, 8. (Shown in dotted lines in Fig. 1.) Toward the rear of the lever 24 there is connected a staff, 25, which serves to support the rear end of the cart after it has been moved to the position indicated in dotted lines in Fig. 1, the lever at this time being brought into engagement with one of the stops 27, thus being held there to prevent the return of the body of the cart to a practically horizontal position.

The cart-body or the frame 14 is provided with two outwardly-projecting studs, 9, formed with disk-shaped heads, the studs being arranged to ride within the slots 2, and thus guide the cart-body, the disk-shaped heads fitting against the outer face of the standards 12.

In the operation of dumping, a proper rotary movement is imparted to the shaft 22 through the medium of its crank-handle 23, and this movement is transmitted through the gearing 20 to the gears 6 of the shaft 5; and as these gears 6 revolve they will travel up the rack 11 and raise the cart-body and the shafts, the forward point of support of the shafts being at this time the saddle-chain. After the cart has been sufficiently elevated to permit of the dumping of its load into a chute the lever 24 is drawn down, and the body of the cart swung to the position shown in dotted lines in Fig. 1, the rear end of the cart being at this time supported by the staff or standard 25.

The invention described is applicable to most any form of cart.

Having thus fully described my invention, what I claim as new, and desire to secure by Letters Patent, is—

1. The combination, with a cart-axle provided with vertical racks, of gears carried by the cart-body and engaging with said racks, a gear-operating mechanism, and a lever pivoted to the cart-body and connected by a link to the shafts, substantially as described.

2. In a cart, the combination, with the shafts and cart-body carried by gears 6, mounted upon a shaft, 5, and a mechanism by which a rotary motion is imparted to said gears, of an axle carrying slotted standards formed with racks, which racks are engaged by the gears 6, studs 9 projecting from the wagon-body and through the slots formed in the standards, said studs being provided with disk-shaped heads, substantially as described.

3. The combination of the body, the running-gear, the racks mounted on the running-gear and extended up on opposite sides of the body and provided with longitudinal slots, studs extended from the body into said slots, and gears engaging said racks, substantially as set forth.

REUBEN T. SCHALL.

Witnesses:
WILLIAM SCHALL,
HOWARD HAMILL.